United States Patent
Motoda

[19]

[11] Patent Number: 5,858,072
[45] Date of Patent: Jan. 12, 1999

[54] GAS SUCTION FILTRATION APPARATUS

[75] Inventor: Kenro Motoda, Tokyo, Japan

[73] Assignee: Motoda Electronics, Co., Ltd, Japan

[21] Appl. No.: 661,594

[22] Filed: Jun. 11, 1996

Related U.S. Application Data

[63] Continuation-in-part of Ser. No. 347,310, Feb. 8, 1995, abandoned.

[51] Int. Cl.$^6$ ................................................. B01D 47/02
[52] U.S. Cl. ............................... 96/332; 55/342; 95/151; 95/226; 96/333; 96/342
[58] Field of Search .......................... 55/247, 256, 257.6, 55/257.7, 258, 267, 279, 342, 350.1, 230, 231, 255; 95/151, 213, 226; 96/332, 333, 342

[56] References Cited

U.S. PATENT DOCUMENTS

| | | | |
|---|---|---|---|
| 153,453 | 7/1874 | Miller | 95/226 |
| 979,210 | 12/1910 | Serrell | 55/255 |
| 979,211 | 12/1910 | Serrell | 55/255 |
| 1,374,689 | 4/1921 | Torrey | 55/256 |
| 1,775,876 | 9/1930 | Vecchio | 55/256 |
| 3,474,597 | 10/1969 | Eckert | 55/231 |
| 3,884,651 | 5/1975 | Velegol | 55/247 |
| 5,078,759 | 1/1992 | Kira | 55/256 |
| 5,354,347 | 10/1994 | McCoy et al. | 55/256 |
| 5,449,398 | 9/1995 | Motoda | 55/256 |

FOREIGN PATENT DOCUMENTS

| | | | |
|---|---|---|---|
| 51-54084 | 5/1976 | Japan | 55/230 |
| 18208 | 11/1896 | United Kingdom | 95/226 |

*Primary Examiner*—Duane S. Smith
*Attorney, Agent, or Firm*—Rogers & KIlleen

[57] ABSTRACT

A gas suction filtration apparatus in which a liquid filter medium is contained in a closed container. A gas intake pipe is positioned so as to introduce the gas to be filtered into the bottom of the container and a suction device applies a suction force to the upper part of the container to draw the gas through the liquid filter medium. Gas-liquid mixing plates are disposed in the container which have numerous holes for passage of the gas therethrough. The mixing plates have diameters only slightly smaller than that of the container, and preferably the gap between the outside diameter of the plates and the inside diameter of the container is smaller than the diameter of the holes so that substantially all of the gas to be filtered must pass through the holes to facilitate contact between the gas and the liquid filter medium.

11 Claims, 3 Drawing Sheets

GAS SUCTION FILTRATION APPARATUS

This is a continuation-in-part of application Ser. No. 08/347,310 filed Feb. 8, 1995, now abandoned, which was a U.S. national stage application of PCT application JP 94/00538 filed Mar. 31, 1994.

The present invention relates to a suction filtration apparatus by which the outside gas is sucked and then passed through liquid filter(s) in the apparatus for removal of the heat of the gas or specific gas components, microorganisms or fine particulate solids contained in the gas.

BACKGROUND ART

Heretofore, there have been known various apparatuses called filtration apparatuses, removal apparatuses and suction apparatuses by which specific gas components contained in gas (air) are recovered by adsorption or microorganisms and fine particulate solid contained in gas are adsorbed and then removed using a down-washing shower and the like.

However, the conventional filtration and adsorption apparatuses are structurally complex and should be applied special principles or techniques to their filtration and adsorption mechanisms. As an inevitable consequence, such apparatuses themselves are expensive "chemical apparatuses", resulting in an economical deficiency.

In particular, as for apparatuses suitable for removal of MRSA (methicillin resistant *Staphylococcus aureus*) which causes so called "hospital infection" and pollen of Sugi (Japanese cedar) which causes so-called "pollen disease", both which are recent problems, or apparatuses suitable for removal of floating agricultural chemicals which cause so-called "House disease" which is a problem for persons engaged in vegetable culture in a house containing vinyl, or apparatuses suitable for removal of puzzolana or sand and dust in desert, any useful one has not been provided yet.

Accordingly, the problem to be solved by the present invention is to provide a suction filtration apparatus which can be constructed very simply due to its extremely simple principle and, furthermore, which can exhibit more excellent filtering property particularly in removal of substances which may cause such various kinds of air pollution as described above, which being current problems, than the conventional apparatuses in spite of its simple structure.

DISCLOSURE OF INVENTION

The suction filtration apparatus of the present invention, which has been made for the purpose of solving the problems described above, is characterized in that a liquid filter medium is contained in a closed container with an upper space maintained within the container; a gas intake conduit pipe for introduction of gas to be filtered into said filter medium is mounted so that its front is positioned outside of said container and its end is put into said filter medium; and a gas take-off conduit pipe or a gas suction means for application of suction force to the space of said container is mounted with the pipe or the suction means communicated with said space.

In the present invention, high temperature water vapor, specific gas components and fine particulates contained in gas to be sucked can be removed in the manner that the high temperature water vapor in the gas is heat-exchanged with a liquid filter medium and the unnecessary gas components and fine particulates are neutralized or removed with said filter medium when the gas is passed through said liquid filter medium by application of suction force.

BEST MODE FOR CARRYING OUT THE INVENTION

Examples of the present invention are illustrated in detail by reference to the drawings.

Figure 1:
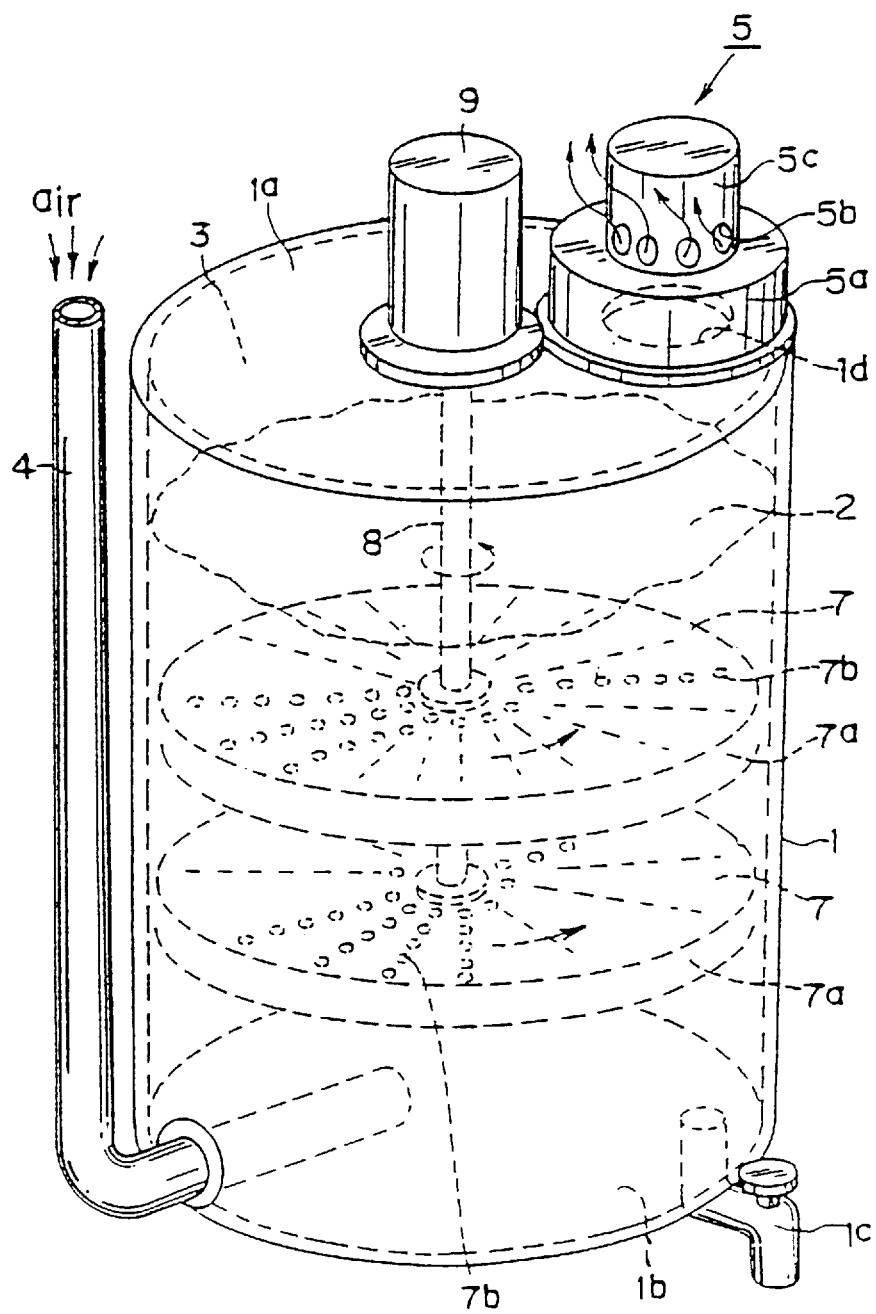
FIG. 1 is a front sectional view of a preferred embodiment of the present invention.

In FIG. 1, section 1 is a cylindrical closed container of which at least the interior surface is rendered acid resistance and corrosion resistance, in which at least one of upper cover 1a and baseplate 1b is removably attached to the container body. Section 2 is a liquid filter medium such as water, which is contained in the container 1 with a space 3 maintained at upper part of the container 1. As the filter medium 2, there can be employed, for example, aqueous solutions of surfactants and so on, solutions of oily substances, neutralizers of alkaline solutions and so on, liquid type of sterilizers and pasteurizers and the like, as well as water described above. Section 1c is a drain pipe for draining the liquid filter medium 2.

Section 4 is a gas intake conduit pipe connected to the baseplate 1b or the side wall near the baseplate 1b by penetrating a through hole. The pipe 4 is stood up from the connecting part to the container 1 and arranged so that the position of its top is higher than the whole length of the container 1.

Section 5 is a fan type of gas suction means which is provided on the upper cover 1a of the container 1, which is mounted so that its suction port is communicated with a hole 1d formed on the upper cover 1a, and in which the fan (not shown in the drawing) can rotate to apply suction force to the upper space 3 of the container 1. The detail structure of the suction means 5 is not shown in the drawing, but the suction means 5 in FIG. 1 is composed of a motor, fan attached to the shaft of the motor, a fan casing 5a in which the fan is contained and the suction port is opened, and a housing 5c of said motor which is connected to the casing and equipped with gas outlets 5b for exhausting the sucked air outside. In the apparatus of the present invention, the suction force caused by the suction means described above may be applied through gas take-off conduit pipe 6 (not shown in FIG. 1), which will described in detail below.

Section 7 is a gas-liquid mixing plate which is mounted so that the plate is dipped in the liquid of the filer medium 2 in the container 1 above, and which is formed so that its outer diameter is slightly smaller than the inner diameter of the container 1. In the mixing plate 7, skirt 7a may be formed around the outer periphery to facilitate capture of the gas so that more gas finds passage through numerous pores 7b which are formed on the surface. The gap between the inner diameter of container 1 and the outer diameter of mixing plate 7 may be smaller than the diameter of pores 7b so that substantially all of the gas to be filtered must pass through pores 7b to facilitate contact between the gas and the filter medium 2. Section 8 is a support pole which supports the mixing plate 7, and section 9 is a motor projecting over of the container 1 form the upper cover 1a, of which shaft is connected to said support pole 8.

In this apparatus, it is arbitrary to arrange two or more of gas-liquid mixing plates 7 described above or not, and it is also arbitrary to rotate the mixing plate(s) 7 using the motor 9 or not. As described above, the embodiment of the suction filtration apparatus of the present invention is composed of the above members 1 (a closed container) to 9 (a motor). The examples to which the apparatus of the present invention is applied are illustrated in the followings.

Figure 2:
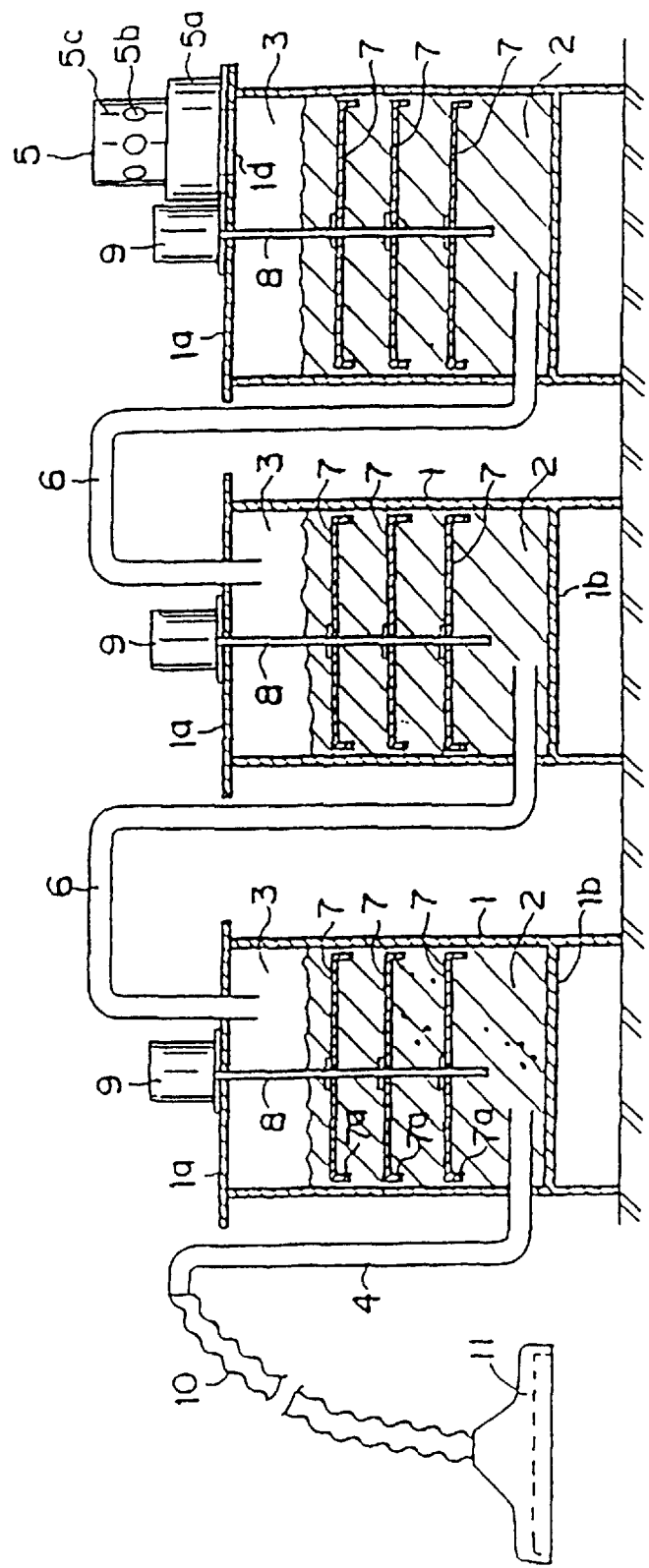
FIG. 2 is a block diagram of an embodiment of a vacuum sweeper type of air cleaner to which the apparatus of the present invention is applied.

At first, a vacuum sweeper in which the apparatus of the present invention shown in FIG. 1 is used is illustrated. In case of a vacuum sweeper, as shown in FIG. 2, a flexible tube 10 is connected to the front of the gas intake conduit pipe 4 and further connected to a conventional wide suction port 11 with slits at its top similarly to the known conventional sweepers.

The motor of the suction means 5 is started to apply the suction force caused by its fan to the upper space 3 of the closed container 1, by which the gas (air) in the upper space 3 is exhausted from the fair outlets 5b and then the suction force by the suction means 5 above begins to apply to the gas intake conduit pipe 4 through the liquid filter medium 2. By the suction force applied to the gas intake conduit pipe 4, the outside gas containing dust is sucked through the flexible tube 10 and the suction port 11, passed through the liquid filter medium 2 and then introduced to the upper space 3 of the closed container 1.

When the outside gas containing dust, which is sucked through the gas intake conduit pipe 4, is passed through the liquid filter medium 2, the gas floats in said filter medium 2 toward the upper space 3 in a form of fine bubbles. In a case where one or more of gas-liquid mixing plates 7 are arranged and these plates 7 are allowed to rotate by means of the motor 9, the gas sucked, which floats in the filter medium 2 in a form of fine bubbles, is further sucked toward the upper space 3 of the closed container 1 in a form of more fine bubbles, by which both the contact area and the connection time of the gas with the filter medium 2 become larger.

As described above, in the outside air introduced to the filter medium 2 to be formed in more fine bubbles and sucked into the upper space 3 of the closed container 1, the fine particulate dust contained in the outside air comes to contact with said liquid filter medium 2 to be subjected to the so-called gravity separation By the gravity separation, all solid contents which compose said dust are dissolved and deposited in the liquid filter medium 2 and, therefore, only gas content is then introduced to the upper space 3 of the container 1. As the result, the gas which is exhausted from the gas outlets 5b of the suction means 5 to outside of the sweeper is dustless, in other words, cleaned gas.

Figure 3:
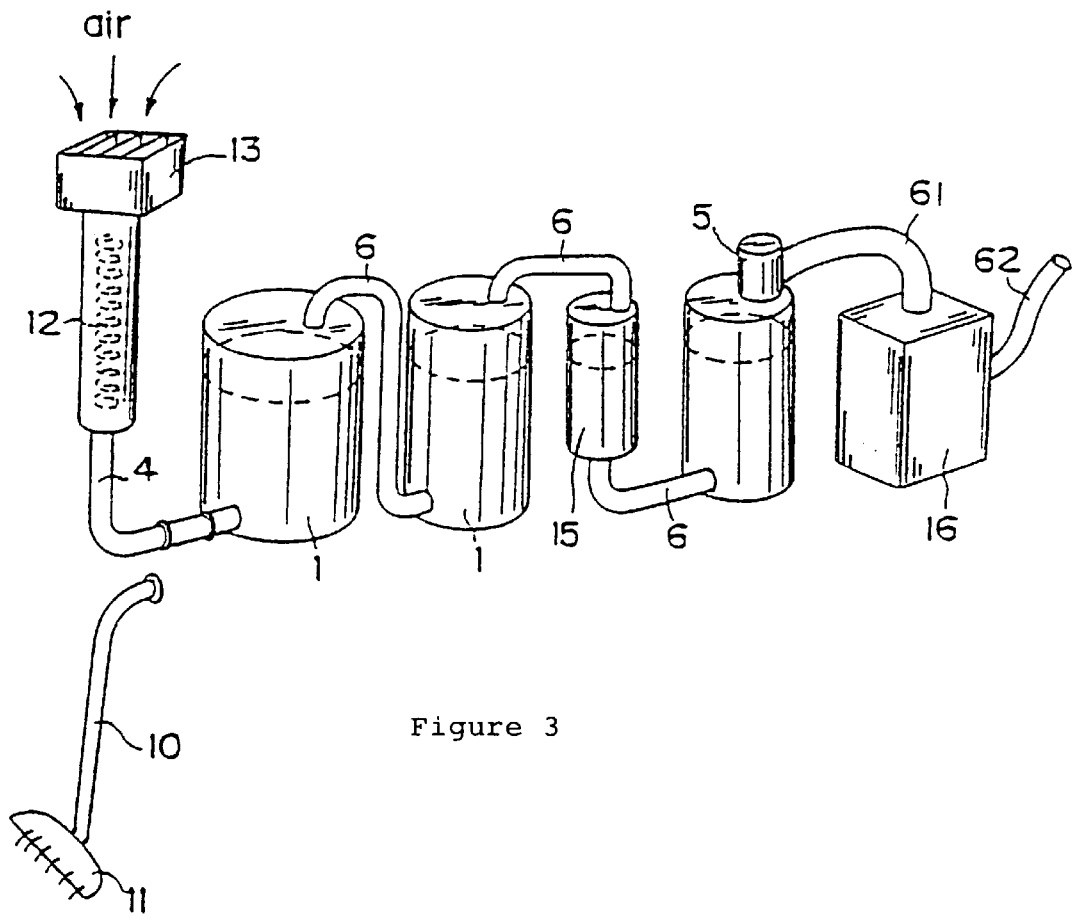
FIG. 3 is a block diagram of an embodiment of an air-cleaning bacteria removal apparatus to which the equipment of the present invention is applied.
Figure 4:
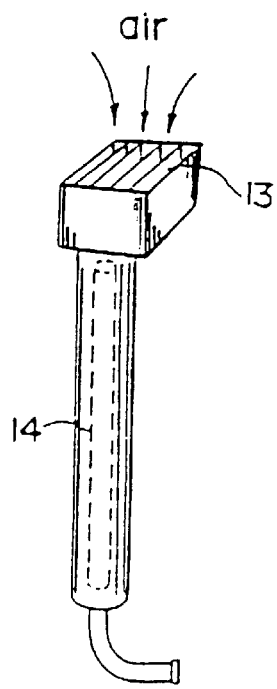
FIG. 4 is a perspective view of another embodiment of the outside air intake of the present invention.

In such sweeper, in order to treat contaminating bacteria contained in the outside gas sucked through the gas intake conduit pipe 4 by means of removal and the like, a suitable heating means 12 such as electric heater may be provided in the middle of the gas intake conduit pipe 4, as shown in FIG. 3, in which the temperature of the pass inside of the pipe 4 is increased to the temperature desirable for sterilization or pasteurization of the bacteria. Other than using such heating means, the sterilization or pasteurization effect of the vacuum sweeper can also be enhanced by using a liquid filter medium 2 of high temperature singly or in combination with said heating means, a liquid filter medium 2 mixed with bactericide(s) or only a bactericide as the filter medium, or by providing a fixed filter 15 containing activated carbon and the like to the gas outlet side. In FIG. 3, section 13 is an outside gas intake. FIG. 4 shows an embodiment of the outside air intake 13 which is imparted with pasteurizing effect by providing a germicidal lamp 14 to the lower part of the outside gas intake 13.

In addition, when the gas to be sucked through the intake conduit pipe 4 is high temperature water vapor or contains malodorous or harmful gas components, the heat of the water vapor can be absorbed by the liquid filter medium 2 and the unnecessary non-desirable gas components can be removed by neutralization or adsorption by said filter medium 2. For example, mounting a porous adsorbent layer (not shown in the drawing) or use of a substance which has a neutralizing or deodorizing function for said gas components as the filter medium 2 singly or in combination with said adsorbent enables not only to absorb the heat of the gas but also to neutralize and remove unnecessary gas component and malodorous components.

The vacuum sweeper having a structure shown in FIG. 2 was tried to be used actually in cement manufacturing factories and metal processing factories where a large amount of powdery dust would be produced and on streets where puzzolana had been fallen As the result, said powdery dust of metal powder and so on and the puzzolana which had been floating or accumulating thinly on floor and ground could be removed from air almost completely without exhausting the dust and puzzolana outside of the closed container 1.

The embodiment of the apparatus described above is one in which only a closed container 1 containing a liquid filter is used. But the apparatus of the present invention may have a structure in which two or more of said containers are connected in a turn, which is illustrated in the followings by reference to FIG. 2.

In the apparatus shown in FIG. 2, three closed containers 1 are connected using gas take-off conduit pipes 6 in turn, and a suction means 5 is mounted on the terminal closed container 1. Each gas take-off conduit pipe 6 through which each container 1 is connected is arranged so that its front is connected to the upper space 3 of the front closed container 1 and its end is put into the liquid filter medium 2 of said container 1.

As the result, the outside gas sucked by the suction means 5 comes to pass through the filter medium 2 in each container 1 in turn to contact with each filter medium 2, and then is exhausted from the gas outlets 5b of the suction means 5 in a form of a cleaned air.

Therefore, from the viewpoint that the outside gas to be sucked can be contacted to the filter mediums 2 in individual closed containers 1 in turn, by varying the functions of filter mediums 2 contained in individual containers 1, it becomes possible to dissolve powdery particulates composed of water-insoluble or slightly water-soluble components such as dust in a filter medium 2 in the next container 1 or to remove unnecessary gas components simultaneously with the filtration of such heterogenic particulates.

As described above, in the apparatus constructed by connecting two or more of closed containers 1 in turn, a suction means 5 is provided to the upper space 3 of each container 1, respectively, and gas outlet 5b of each suction means 5 of the closed containers 1 including the forefront container to one container this side of the terminal container is connected to the front of the gas take-off conduit pipe 6, to give a reasonable apparatus in sucking efficiency and lowering of load applied to each suction means 5. In the present invention, the apparatus may be constructed by arranging two or more of closed containers 1 each equipped with a gas intake conduit pipe 4 and a suction means 5 in a line, in which a gas intake is connected to each gas intake conduit pipe 4.

The apparatus of the present invention described above can remove fine particulates and contaminating bacteria contained in the outside gas and sterilize or pasteurize such bacteria. Therefore, the apparatus is extremely useful as an air cleaning apparatus, for example, as shown in FIG. 3, or a removal apparatus for contaminating bacteria in air used in hospitals, vinyl houses, gymnasiums, assembly rooms and the like. In the apparatus shown in FIG. 3, a fixed filter 15 which contains activated carbon and heat source therewithin may be provided between three closed containers 1 connected in a line, in order to improve the removal ability for unnecessary gas components and contaminating bacteria which are contained in the air on its way to cleaning and can not be removed by the filter medium(s) 2 in the closed container(s) 1 through which the air has been already passed, and the sterilizing or pasteurizing ability for such bacteria.

In the apparatus shown in FIG. 3, a dehumidifier 16 is provided with being communicated with the air outlets 5b of the suction means 5 attached to the terminal closed container 1 through a connection pipe 61, to dehumidify the cleaned air, which can be re-used as "clean air". In FIG. 3, section 62 is an exhaust pipe. In addition, in the apparatus of FIG. 3, an air intake 13 with a flexible tube 10 for sweeper, a heating means 12 and a germicidal lamp 14 can be connected selectively to an air inlet pipe 4, by which the apparatus can be advantageously used according to various uses and purposes.

In this case, similarly to the vacuum sweeper described above, in both an apparatus employing only a closed container 1 and an apparatus employing two or more of closed containers 1 connected in a line or positioned in parallel, it is often desirable for improvement of suction-cleaning efficiency to arrange two or more of suction means 5 per a closed container 1. Such arrangement results in a large suction capacity, which is liable to make the contact time of the outside air sucked with the filter medium 2 shorter. In order to improve this defect, it is desirable to make the size of the air hole 7b on the gas-liquid mixing plate 7 smaller, to increase the number of the plates 7 to be arranged, or to increase the number of the closed containers 1 to be connected.

INDUSTRIAL APPLICABILITY

The gas suction filtration apparatus of the present invention, as described above, in which the outside gas to be sucked into a closed container is applied with suction force from backward of a liquid filter medium to make contact the gas with said filter medium by force, exhibits more excellent filtering effect compared to the conventional liquid filter type of removal apparatuses, and enables to remove high temperature water vapor, various kinds of fine particulates including dust and Sugi pollen or unnecessary gas components including bacteria and malodor components which are contained in said gas completely.

The apparatus described above is vary simple in structure and, therefore, not only can be constructed in very low cost and very easily compared to the conventional apparatuses, but also can be driven in low running cost. Accordingly, the apparatus of the present invention is extremely useful as a pasteurizable cleaning apparatus for air in hospitals and sickrooms and as an air cleaning apparatus for prevention of so-called "House disease" caused in a vinyl house, as well as an apparatus for removal of dust, sand, Sugi pollen or the like in buildings where a great number of people come together or factories or on streets.

Furthermore, the apparatus is also extremely useful as a liquid filter not only for absorption of heat of high temperature water vapor, chlorine gas and so on which are generated at the thermal decomposition treatment of combustible waste such as garbage, but also for removal of unnecessary gases such as chlorine gas described above.

What is claimed:

1. A gas suction filtration apparatus comprising:
    a closed cylindrical container for a liquid filter medium with an upper space therein;
    a gas intake conduit pipe for introduction of the gas to be filtrated into said filter medium, said gas intake conduit pipe having its intake external to said container and its exhaust interior to a bottom of said filter medium;
    a gas suction means communicating with the upper space for application of a suction force to the upper space; and
    plural gas-liquid mixing plates with numerous pores on their surfaces for enhancing contact between said filter medium and the gas to be sucked, said mixing plates being rotatable about an axis of said container and each having an outside diameter slightly smaller than an interior diameter of said container so that substantially all of the gas to be filtered must pass through said pores in said mixing plates to facilitate contact between the gas and the liquid filter medium,
    each of said mixing plates further comprising a skirt about its periphery which extends toward the bottom of said container to facilitate capture of the gas so that more gas finds passage through said pores.

2. The apparatus of claim 1 wherein the filter medium is a liquid selected from the group consisting of water, aqueous solutions of surfactants, neutralizing solutions for gas components contained in the gas to be sucked, solutions mixed with oily substances, sterilizing or pasteurizing solutions.

3. The apparatus of claim 1 wherein two or more of said closed containers are arranged in a line, in which each of said closed containers is connected in turn so that the upper space of a front one of said closed containers is connected to the filter medium in a back one of said closed containers through a take-off conduit pipe and the upper space of a last one of said closed containers is communicated with said gas suction means.

4. The apparatus of claim 3 wherein each closed container contains a different liquid filter medium.

5. The apparatus of claim 4 wherein the intake conduit pipe for taking in the outside gas or the take-off conduit pipe for introduction of the gas passed through the filter medium to the outside of the closed container is equipped with a heating means or a heating filter for heating its path.

6. The apparatus of claim 1 wherein a gap between the outside diameter of said mixing plates and the interior diameter of said container is smaller than a diameter of said pores.

7. A gas suction filtration apparatus comprising:
    a cylindrical, closed container for a liquid filter medium, the container having an upper space above the filter medium;
    intake means for introducing a gas to be filtered at a bottom of said container and suction means for applying a suction force to the upper space for drawing the gas through the liquid filter medium;

at least one circular mixing plate in said container between the bottom thereof and the upper space which has a plurality of holes for passage of the gas therethrough, said mixing plate having an outside diameter and said cylindrical container having an inside diameter which differ by less than a diameter of said holes so that substantially all of the gas to be filtered must pass through said holes in said mixing plate to facilitate contact between the gas and the liquid filter medium; and means for rotating said mixing plate about the axis of said cylindrical container.

8. The apparatus of claim 7 comprising two spaced-apart ones of said mixing plate.

9. The apparatus of claim 7 wherein said means for rotating comprises a motor aligned with the axis of said cylindrical container for imparting a turning force to a pole on the axis which supports said mixing plate.

10. The apparatus of claim 7 further comprising plural ones of the apparatus in which an output from said suction means from one apparatus is provided to an intake means of another apparatus.

11. The apparatus of claim 7 wherein said mixing plate comprises a skirt about its periphery which extends toward the bottom of said container to facilitate capture of the gas so that more gas finds passage through said holes.

* * * * *